United States Patent [19]

Yu

[11] Patent Number: 4,485,230

[45] Date of Patent: Nov. 27, 1984

[54] POLYARYLATE FORMATION BY ESTER INTERCHANGE REACTION

[75] Inventor: Michael C. Yu, Bartlesville, Okla.

[73] Assignee: Phillips Petroleum Company, Bartlesville, Okla.

[21] Appl. No.: 531,540

[22] Filed: Sep. 13, 1983

[51] Int. Cl.$^3$ ................ C08G 63/18; C08G 63/60
[52] U.S. Cl. ................ 528/125; 528/126; 528/128; 528/173; 528/176; 528/179; 528/190; 528/191; 528/193; 528/194; 528/271
[58] Field of Search .......... 528/125, 126, 128, 173, 528/176, 179, 190, 191, 193, 194, 271

[56] References Cited

U.S. PATENT DOCUMENTS

| | | |
|---|---|---|
| 2,595,343 | 5/1952 | Drewitt et al. |
| 2,600,376 | 6/1952 | Caldwell. |
| 3,309,334 | 3/1967 | Holub. |
| 3,444,131 | 5/1969 | Rosenbrock et al. |
| 3,684,766 | 8/1972 | Jackson, Jr. |
| 3,780,148 | 12/1973 | Jackson, Jr. |
| 3,824,213 | 7/1974 | Stackman. |
| 3,948,856 | 4/1976 | Stackman. |
| 4,075,173 | 2/1978 | Maruyama et al. .......... 528/193 |
| 4,281,099 | 7/1981 | Maresca. |
| 4,294,956 | 10/1981 | Berger et al. .......... 528/125 |
| 4,294,957 | 10/1981 | Berger et al. .......... 528/179 |
| 4,296,232 | 10/1981 | Maresca et al. .......... 528/179 |
| 4,314,051 | 2/1982 | Berger et al. .......... 528/173 |
| 4,349,659 | 9/1982 | Kato et al. .......... 528/126 |
| 4,374,239 | 2/1983 | Berger et al. .......... 528/193 |
| 4,395,536 | 7/1983 | Charbonneau .......... 528/176 |
| 4,415,721 | 11/1983 | Kosanovich et al. .......... 528/179 |

FOREIGN PATENT DOCUMENTS 35269  9/1981  European Pat. Off. .

OTHER PUBLICATIONS

Bier, "Polyarylates (polyesters from aromatic dicarboxylic acids and bisphenols)", *Polymer*, vol. 15, Aug. 1974, pp. 527-535.
Eareckson III, "Interfacial Polycondensation. X. Polyphenyl Esters", *Journal of Polymer Science*, vol. XL, pp. 399-406 (1959).

*Primary Examiner*—Lester L. Lee
*Attorney, Agent, or Firm*—Lyell H. Carver

[57] ABSTRACT

A process for preparing aromatic polyesters (polyarylates) by heating a bisphenol (e.g., Bisphenol-A), at least one dicarboxylic acid (e.g., terephthalic acid and isophthalic acid) and acetic anhydride, in a carefully programmed sequence of steps, resulting in a polymer of suitable inherent viscosity and good color.

18 Claims, No Drawings

POLYARYLATE FORMATION BY ESTER INTERCHANGE REACTION

FIELD OF THE INVENTION

The invention pertains to a method for preparing automatic polyesters (polyarylates). In a further aspect, the invention relates to aromatic polyesters with suitable inherent viscosity and color.

BACKGROUND OF THE INVENTION

Aromatic polyesters (polyarylates) are a class of polyesters generally made from a bisphenol and an aromatic diacid. Heretofore, the prior art has taught that polyarylates preferably are made in a two-step process starting with the bisphenol and reacting with such as acetic acid or acetic anhydride to prepare a diacetate of the bisphenol, followed by reaction with an aromatic diacid. In general, the prior art has taught that satisfactory polymer cannot be made from such as Bisphenol-A diacetate and aromatic diacids in the absence of a solvent, which, of course, adds another reactant to control, later separate, and in a commercial process recover for recycle.

In addition to the cumbersome nature of a multi-step process, the polyarylates in the past have frequently been unduly brittle, or had low inherent viscosities, or have been dark colored which is undesirable, or some combinations of these undesirable features.

Needed is a simple, effective, useful process to produce polyarylates conveniently, with a minimum of reagents, and yet result in a product of good moldability, suitably high inherent viscosity, and low color.

BRIEF DESCRIPTION OF THE INVENTION

I have discovered a process for preparing aromatic polyesters (polyarylates) from a bisphenol, an aromatic diacid, in admixture with a carboxylic acid anhydride, by conducting the process reaction in four phases:
(1) heating of an admixture of the reactants at a first moderately elevated temperature, not to exceed about 160° C., in an inert gas atmosphere for a first suitable time interval;
(2) gradually elevating the temperature of the reaction admixture, in the inert gas atmosphere, to a higher second temperature over a second suitable time interval while maintaining a flow of inert gas to assist in removing volatiles;
(3) reducing the pressure of the reaction admixture gradually to a vacuum condition during a third time interval of at least 60 minutes while substantially maintaining the second higher temperature; and
(4) maintaining the reaction admixture at substantially the higher second temperature at the vacuum conditions for a suitable fourth time interval.

The result of my process is a light-colored, tough, polyarylate polymer.

DETAILED DESCRIPTION OF THE INVENTION

Bisphenol

The bisphenols suitable for use in the context of my invention can be represented by the structural formula:

HO—Ar—OH wherein Ar is a divalent aromatic unit. Examples of such divalent aromatic units Ar include:

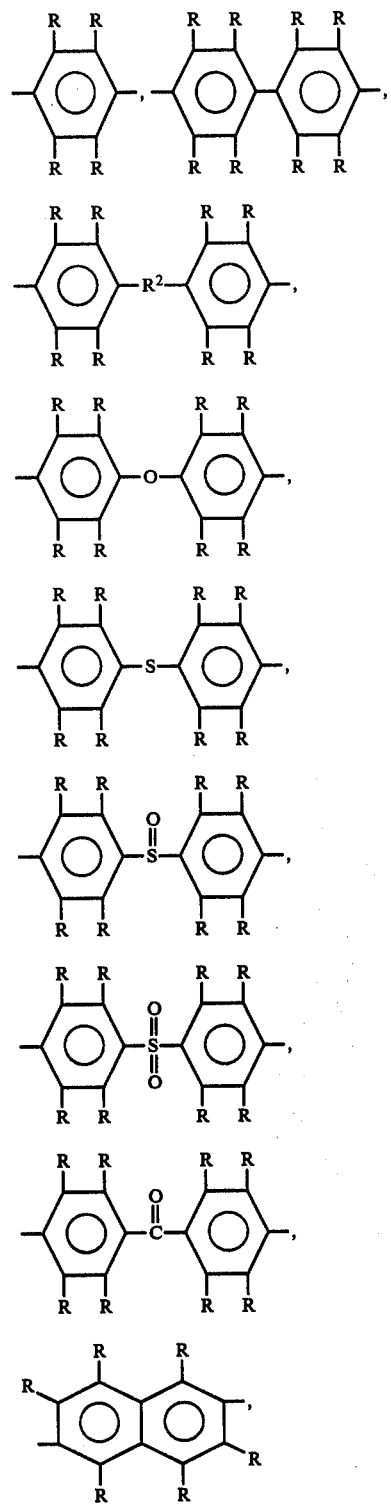

and the like. In the above formulae, each R can be the same or different, and each is independently selected from and represents H or a lower alkyl or cycloalkyl groups of 1 to 8 carbon atoms per group, presently preferably H or the methyl group. $R^2$ is an alkylene or alkylidene radical having 1 to 8 carbon atoms, such as —CH$_2$—, —CH$_2$—CH$_2$—, —CH(CH$_3$)—, —C(CH$_3$)$_2$—, and the like.

Examples of bisphenols include:
hydroquinone,
resorcinol,
bis(4-hydroxyphenyl)methane,
1,1-bis(4-hydroxyphenyl)ethane,
1,2-bis(4-hydroxyphenyl)ethane,
2,2-bis(4-hydroxyphenyl)propane (Bisphenol A),
2,2-bis(2,6-dimethyl-4-hydroxyphenyl)propane,
2,2-bis(2,4-dioctyl-4-hydroxyphenyl)propane,
2,2-bis(2-t-butyl-4-hydroxyphenyl)pentane,
3,3-bis(2-isoamyl-4-hydroxyphenyl)heptane,
2,4-bis(2-isoamyl-4-hydroxyphenyl)heptane,
bis(4-hydroxyphenyl)ether,
bis(4-hydroxyphenyl)sulfide,
bis(4-hydroxyphenyl)sulfoxide
bis(4-hydroxyphenyl)sulfone,
bis(4-hydroxybenzophenone), and
2,6-dihydroxynaphthalene.

The presently preferred bisphenol is Bisphenol-A.

Diacids

Diacids employable in the process of my invention are the aromatic dicarboxylic acids. These include such as the presently preferred terephthalic acid, isophthalic acid, and mixtures thereof, as well as naphthalene dicarboxylic acids, and alkyl-substituted homologs of such dicarboxylic acids wherein the alkyl group contains 1 to 4 carbon atoms.

Mixtures of any ratio of isophthalic acid and terephthalic acids can be used. In these mixtures, the isophthalic acid:terephthalic acid mole or weight ratio can range from such as about 95:5 to 5:95. Preferably, the ratio in such a mixture is in the range of about 90:10 to 30:70 for more amorphous properties, with a presently more preferred ratio of about 70:30 to 30:70 to produce the presently preferred non-crystalline polyarylates. Outside of the broad range, crystalline characteristics of the resulting polyarylates become predominant as is apparent by examination by differential scanning calorimetry.

Other suitable and typical aromatic diacids include those mentioned and:
5-methylisophthalic acid,
2-methylisophthalic acid,
2-methyl-5-ethylisophthalic acid,
2-methylterephthalic acid,
2,6-dimethylterephthalic acid,
2-propylterephthalic acid,
2,6-naphthalene dicarboxylic acid, and mixtures thereof.

Optionally, hydroxyaromatic monocarboxylic acids, such as m- or p-hydroxybenzoic acid, can be used in part, such as in a mole ratio relative to the diacid of about 1:100 to 1:2, preferably about 1:100 to 1:10, to vary the properties of the product.

Acid Anhydrides

The acid anhydride employed is derived from a hydrocarbon organic dicarboxylic acid, preferably of 2 to 8 carbon atoms per molecule. The presently preferred acid anhydride is acetic anhydride for convenience and availability. Other useful acid anhydrides include such as propionic anhydride, butyric anhydride, valeric anhydride, caproic anhydride, and caprylic anhydride. Mixtures can be employed.

The anhydride(s) used preferably should be normally liquid, or, if normally solid, should have a melting point not exceeding about 40° C. so as to be liquid under convenient reaction temperatures.

REACTION CONDITIONS

Summary

In accordance with my invention, at least one bisphenol, at least one aromatic diacid, and at least one acid anhydride, are admixed together to form a reaction admixture, and the reaction then proceeds in a programmed sequence of four phases:

(1) heating the reactants at a first moderately elevated temperature, preferably not to exceed about 160° C., in an inert gas atmosphere, for a suitable time;

(2) elevating the temperature of the reaction admixture, in the inert gas atmosphere, to a higher second temperature during a second time interval while maintaining a flow of inert gas into and through the reactants to assist in removing volatiles;

(3) reducing the pressure gradually over a third time interval of at least about 60 minutes to a vacuum condition while maintaining the higher second temperature;

(4) heating the reaction mixture at substantially the second temperature at vacuum condition for a suitable fourth further time interval; and recovering the product.

Reactant Ratios

The molar ratio of bisphenol:aromatic diacid(s) should be such as to avoid large excesses of either reactant, though an excess of the bisphenol generally is considered less desirable. The presently preferred molar ratio of bisphenol:aromatic diacid(s) should be in the range of about 0.8:1 to 1.2:1, presently more preferably very close to stoichiometric, about 0.95:1 to 1:05:1 mole ratio.

Further employed is the hydrocarbon organic acid anhydride. The amount employed can range widely as convenient. Presently suggested is a molar ratio of anhydride:aromatic diacid(s) in the range of about 1:1 to 4:1, preferably about 2:1 to 2.3:1.

REACTION STEPS

First step

In the first reaction step, the reactants as a reaction admixture are placed in a reactor means which is filled with an inert gas blanket.

The reaction admixture is heated up to a first reaction temperature not to exceed about 160° C., preferably in the range of about 120° to 160° C., more preferably about 130° to 140° C., under an inert gas atmosphere during a first heating time interval of about 0.25 to 2 hours, preferably about 0.5 to 0.75 hour. The reaction admixture is maintained at substantially the first reaction temperature for an effective time, preferably about 1 to 3 hours, more preferably about 1.3 to 1.7 hours.

The inert gas and the reaction admixture is maintained at a pressure of about 0 to 120 psig, preferably about 0 to 20 psig. More preferably, the first step is conducted while a stream of inert gas passes through the reaction admixture.

The inert gas can be selected from the presently preferred nitrogen, as well as from such as helium, argon, and neon.

Second Step

In the second step, the reactor means is vented within a short time period, of such as about 10 minutes, when an elevated inert gas pressure (i.e., >0 psig) has been used in the first step. The temperature of the reaction admixture is raised to a higher second reaction temperature, in the range of about 250° C. to 350° C., preferably 280° C. to 330° C., most preferably 290°-310° C., and maintained thereat over a second time interval of about 1 to 4 hours, presently preferred about 1 to 2 hours.

Third Step

Thereafter, the pressure on the reaction admixture is gradually reduced to a vacuum condition of about 1 to 30 mm Hg, preferably about 1 to 5 mm Hg, over a third time interval of at least about 1 hour, preferably over about 1 to 1.5 hours, all while substantially maintaining the aforesaid second reaction temperature. Carboxylic acid, water, and any excess reactant, are removed by evaporation during this step.

A prepolymer is formed in the sequence of the first three steps. This relatively low molecular weight prepolymer preferably has an inherent viscosity of about 0.2 to 0.3.

Fourth Step

The prepolymer then is maintained at substantially the second reaction temperature, preferably at about 280° to 330° C., under the vacuum condition for a fourth time interval, of at least about 2 hours, preferably about 2 to 4 hours, most preferably, about 2 to 3 hours, to complete the polymerization so as to prepare a polymer preferably having an inherent viscosity of about 0.5 to 1.

Product Recovery

All four process steps of this invention can be carried out as a one-pot process in the same reactor. The cooled product is a hardened polymer product which can be removed from the reactor by breaking pieces of polymer off by means of such as chisel and hammer. Obviously, this recovery method is not very feasible for large-scale, commercial processes.

In the preferred recovery process, the prepolymer is prepared by the first, second and third steps in an autoclave or similar reactor means, and then extruded by means of elevated pressure under an inert gas into a ventable extruder such as a Polycon ® twin extruder, where the fourth step is carried out. The final polymer then is preferably expelled (extruded) through one or more dies, cooled (e.g., in a cold water bath), and chopped into pellets.

EXAMPLES

Examples are provided in an effort to assist one skilled in the art to a further understanding of the invention, and yet not be unduly limitative of the reasonable scope of the invention. The particular reactants, conditions, ratios, and the like, are all intended to be illustrative of my invention, and not limitative of the reasonable and suitable scope thereof.

Example

In the runs of this example, results are shown of numerous experimental runs for preparing polyarylates from Bisphenol-A (abbreviated BPA; UHP-grade) supplied by Union Carbide Corp., Danburg, Conn.), terephthalic acid (abbreviated TPA; fiber grade; supplied by Amoco Chem. Corp., Chicago, Ill.), isophthalic acid (abbreviated IPA; ultra-pure grade IPA 220; supplied by Amoco Chem. Corp.), and acetic anhydride (abbreviated AA; 99+% purity; supplied by Aldrich Chem. Co., Milwaukee, Wisc.). These reactants were charged to a 2-liter, stirred autoclave made of 316 stainless steel. The autoclave was equipped with valves and pipes for pressurizing, venting, evacuating, and distilling.

The objective of the polymerization runs, the most pertinent process parameters of which are summarized in Table IA, was, was to make amorphous polyarylates of light color and high inherent viscosity (a measure of molecular weight), without excessive foaming and plugging problems during the vacuum distillation stage. The amounts of reactants used were about 1 mole of BPA, about 0.5 mole of TPA, about 0.5 mole of IPA, and about 2.15-2.2 moles of AA.

TABLE IA

| | Phase I | | | | Phase II | | |
|---|---|---|---|---|---|---|---|
| | 1st Peak | Peak | Heating Time (minutes) | | 2nd Peak | Heating Time (Minutes) | |
| Run | Temp. (°C.) | Press. (psig) | up to Peak Temp. | at Peak Temp. | Temp. (°C.) | During Venting | During $N_2$ Purge |
| 1 | 200–230 | 30–55 | 45 | 50 | 295 | 10 | 120 |
| 2 | 240–260 | 150 | 60 | 30 | 285 | 90 | — |
| 3 | 200–205 | 100 | 35 | 85 | 291 | 20 | 48 |
| 4 | 200–205 | 100 | 30 | 90 | 296 | 20 | 55 |
| 5 | 200–201 | 110 | 50 | 90 | 285 | 30 | 45 |
| 6 | 206–210 | 170 | 65 | 90 | 272 | 55 | 10 |
| 7 | 200–210 | 170–230 | 35 | 120 | 295 | 70 | 25 |
| 8 | 200–204 | 100–105 | 40 | 120 | 304 | 60 | 55 |
| 9 | 200–202 | 170 | 35 | 120 | 304 | 60 | 45 |
| 10 | 200–201 | 120–160 | 50 | 90 | 302 | 30 | 55 |
| 11 | 200–205 | 105 | 32 | 90 | 293 | 30 | 118 |
| 12 | 200–204 | 92–110 | 43 | 90 | 306 | 49 | 119 |
| 13 | 200–206 | 118 | 40 | 120 | 305 | 30 | 83 |
| 14 | 199–202 | 110 | 30 | 120 | 299 | 28 | 88 |
| 15 | 200 | 130–135 | 42 | 120 | 300 | 42 | 75 |
| 16 | 198–200 | 50–60 | 35 | 125 | 280 | 20 | 70 |
| 17 | 200–205 | 160 | 39 | 120 | 300 | 30 | 65 |
| 18 | 200 | 90 | 25 | 120 | 299 | 25 | 98 |
| 19 | 200–240 | 260–280 | 105 | 45 | 290 | 60 | 40 |
| 20 | 194–200 | 100–120 | 35 | 120 | 295 | 25 | 70 |
| 21 | 140–150 | 85 | 35 | 90 | 285 | 5 | 90 |
| 22 | 150 | 50–80 | 35 | 90 | 300 | 10 | 95 |
| 23 | 150–151 | 40–50 | 25 | 60 | 310 | 18 | 255 |

TABLE IA-continued

| | Phase I | | | | Phase II | | |
|---|---|---|---|---|---|---|---|
| | 1st Peak | Peak | Heating Time (minutes) | | 2nd Peak | Heating Time (Minutes) | |
| Run | Temp. (°C.) | Press. (psig) | up to Peak Temp. | at Peak Temp. | Temp. (°C.) | During Venting | During $N_2$ Purge |
| 24 | 150–160 | 40 | 31 | 90 | 305 | 40 | 160 |

TABLE IB

| | Phase III | | | | | | |
|---|---|---|---|---|---|---|---|
| | Final Press. | Final | Heating Time (minutes) | | Polymer | | |
| Run | (mm Hg) | Temp. (°C.) | During Evacuation | at Final Press. | Color | IV | Observation |
| 1 | 0.1–0.4 | 300–320 | 55 | 70 | dark amber | 0.25 | — |
| 2 | 5 | 298–299 | 100 | 85 | medium amber | 0.37 | no foaming |
| 3 | 5 | 301–311 | 47 | 115 | — | 0.66 | foaming problems |
| 4 | 5 | 298–310 | 95 | 145 | — | 0.50 | no foaming |
| 5 | 5 | 300–319 | 85 | 120 | amber | 0.61 | — |
| 6 | 4–5 | 300–319 | 70 | 145 | dark brown | — | some plugging |
| 7 | 3–5 | 305–322 | 75 | 140 | dark | 0.52 | — |
| 8 | 5 | 304–310 | 80 | | medium dark | 0.60 | — |
| 9 | 8 | 300–330 | 75 | 195 | medium amber | 0.35 | — |
| 10 | 5 | 310–324 | 70 | 150 | dark amber | 0.44 | — |
| 11 | 5 | 310 | 40 | — | — | — | lines plugged |
| 12 | 5 | 313–329 | 85 | 125 | medium amber | 0.52 | — |
| 13 | 1–5 | 317–320 | 70 | 120 | good color | 0.69 | — |
| 14 | 1–5 | 299–318 | 65 | 120 | — | 0.32 | plugging problems |
| 15 | 1–5 | 300–317 | 66 | 65 | medium dark | 0.66 | no plugging |
| 16 | 1 | 300 | 60 | 120 | good color | 0.60 | — |
| 17 | 5 | 310–315 | 65 | 120 | dark | 0.74 | — |
| 18 | 5 | 311–319 | 67 | 75 | medium amber | 0.40 | — |
| 19 | 2–5 | 280 | 60 | 120 | dark | 0.53 | — |
| 20 | 1–5 | 290–310 | 60 | 120 | dark amber | 0.72 | — |
| 21 | 1–5 | 300–310 | 55 | 120 | good color | 0.32 | — |
| 22 | 1–5 | 310–315 | 115 | 120 | light color | 0.59 | — |
| 23 | 5 | 311 | 54 | 58 | good color | 0.27 | partial plugging |
| 24 | 1–5 | 310 | 60 | 170 | medium amber | 0.50 | some sublimation[2] |

[1] venting was done at the 1st peak temperature
[2] several grams of sublimate accumulated on the upper reactor walls; observed also in various other runs not listed in this table.

Data in Table IA and IB show the following critical parameters:

(1) the peak temperature during the first heating stage under elevated pressure should not exceed about 160° C. to attain a light colored polyarylate;

(2) the time for reducing the pressure from about 760 to about 1–5 mm Hg should be at least 60 minutes so as to avoid foaming and vacuum line plugging problems;

(3) the heating time at the final temperature of 300°–320° C. under vacuum conditions should be about 2–3 hours to give a polymer inherent viscosity of at least about 0.5

Exemplary Summary

In this summary, the optimal lab-scale process conditions for making amorphous polyarylates having light (yellow) color and desirably high inherent viscosity (at least about 0.5) are summarized. One mole of BPA, about 1 mole of a mixture of TPA and IPA (molar ratio 7:3 to 3:7, preferably 1:1), and 2.2 moles of AA are placed in a closed steel autoclave (about 2 liter capacity). The cold autoclave is pressurized three times with about 150 psi $N_2$ and vented to atmospheric pressure. The reactor is heated to about 130°–140° C. within a time period of about 30–40 minutes while a continuous stream of 0.4 SCFM $N_2$ is passed through the autoclave. Then the reaction mixture is kept at about 130°–140° C. in a nitrogen atmosphere (optionally under 60–120 psig pressure) for about 1.5 hours.

During the second phase, the autoclave, if under elevated pressure, is vented at about 130°–140° C. within about 10 minutes to about atmospheric pressure. Then the temperature is gradually raised to about 300° C. within a time period of about 1.5 hours, while a continuous stream of $N_2$ is passed through the reactor (autoclave) and volatiles (mainly acetic acid) are distilled off. To avoid the accumulation of variable amounts of sublimate on the upper inside walls of the reactor, the entire autoclave including its head and its exit lines are heated.

During the third phase of the process, the reactor is gradually evacuated at about 300° C. to a final pressure of about 1–5 mm Hg during a time period of at least 60 minutes. Then the reactor content is heated for at least two additional hours, preferably about 3 hours, at a temperature of about 300° to 320° C. and a pressure of 1 to 5 mm Hg.

In a lab scale process, the hard final polymer is removed from the cold steel reactor with tools such as chisel and hammer. In a pilot or commercial process (employing larger amounts of BPA, TPA/IP and AA and a proportionately larger autoclave than indicated above, yet retaining the above-cited molar ratios), the intermediate polymer ("prepolymer") from Phase II is expelled into a heated extruder, which can be evacuated to about 1–5 mm Hg, and then polymerized under Phase III conditions. The finished polymer is extruded through one or more dies, cooled (e.g., in a water bath) and chopped into pellets.

The disclosure, including data, has illustrated the value and effectiveness of my invention. The Examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. The process of preparation of a polyarylate which comprises heating a reaction admixture comprising at least one bisphenol, at least one aromatic dicarboxylic acid, and at least one organic acid anhydride, employing a mole ratio of bisphenol:diacid of about 0.8:1 to 1.2:1, conducted in steps comprising:
   (a) heating said reaction admixture up to a moderately elevated first temperature not to exceed about 160° C. at a suitable pressure under an inert gas atmosphere during a first time interval of about 0.25 to 2 hours, and maintaining said first temperature for about 1 to 3 hours;
   (b) elevating the temperature of the reaction admixture to a higher second temperature in the range of about 250° to 350° C. and maintaining said higher second temperature for a second time interval of about 1 to 4 hours while maintaining said inert gas atmosphere;
   (c) reducing the pressure of the reaction admixture gradually to a vacuum condition during a third time interval of at least about 1 hour, while substantially maintaining said higher second temperature; and
   (d) maintaining the reaction admixture at substantially said higher second temperature under said vacuum condition for a fourth time interval of at least about 2 hours,
thereby producing said polyarylate.

2. The process of claim 1 wherein said bisphenol is represented by the structural formula:

wherein Ar is a divalent aromatic radical.

3. The process of claim 2 wherein in said bisphenol, said Ar is selected from the group consisting of:

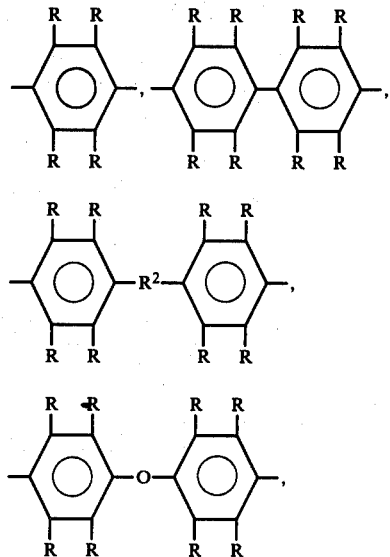

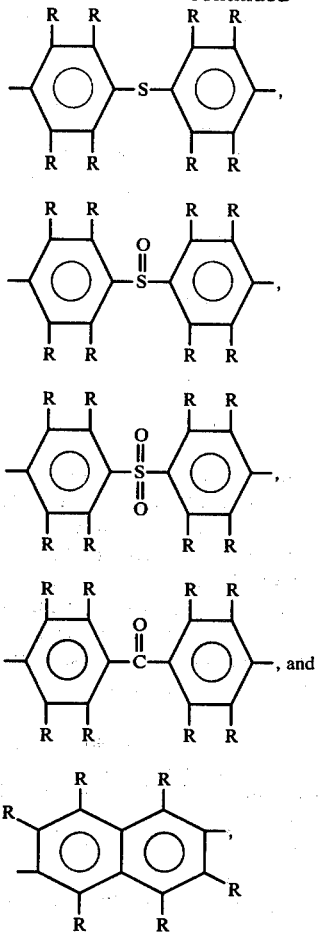

wherein each R can be the same or different and represents either H or alkyl or cycloalkyl groups of 1 to 8 carbon atoms per group; and $R^2$ is an alkylene or alkylidene radical having 1 to 8 carbon atoms.

4. The process of claim 3 wherein R is H or the methyl group, and $R^2$ is selected from the group consisting of —$CH_2$—, —$CH_2$—$CH_2$—, —$CH(CH_3)$—, and —$C(CH_3)_2$—.

5. The process of claim 4 wherein said bisphenol is selected from the group consisting of:
hydroquinone,
resorcinol,
bis(4-hydroxyphenyl)methane,
bis(4-hydroxyphenyl)methane,
1,1-bis(4-hydroxyphenyl)ethane,
1,2-bis(4-hydroxyphenyl)ethane,
2,2-bis(4-hydroxyphenyl)propane (Bisphenol A),
2,2-bis(2,6-dimethyl-4-hydroxyphenyl)propane,
2,2-bis(2,4-dioctyl-4-hydroxyphenyl)propane,
2,2-bis(2-t-butyl-4-hydroxyphenyl)pentane,
3,3-bis(2-isoamyl-4-hydroxyphenyl)heptane,
2,4-bis(2-isoamyl-4-hydroxyphenyl)heptane,
bis(4-hydroxyphenyl)ether,
bis(4-hydroxyphenyl)sulfide,
bis(4-hydroxyphenyl)sulfoxide
bis(4-hydroxyphenyl)sulfone,
bis(4-hydroxybenzophenone),
2,6-dihydroxynaphthalene, and
mixtures thereof.

6. The process of claim 1 wherein said aromatic dicarboxylic acid is selected from the group consisting of terephthalic acid, isophthalic acid, naphthalene dicarboxylic acids, and alkyl-substituted homologs of these carboxylic acids wherein the alkyl group contains 1 to 4 carbon atoms, and mixtures thereof.

7. The process of claim 6 wherein said aromatic carboxylic acid is selected from the group consisting of:
   5-methylisophthalic acid,
   2-methylisophthalic acid,
   isophthalic acid,
   terephthalic acid,
   2-methyl-5-ethylisophthalic acid,
   2-methylterephthalic acid,
   2,6-dimethylterephthalic acid,
   2-propylterephthalic acid,
   2,6-naphthalene dicarboxylic acid, and
   mixtures thereof.

8. The process of claim 6 further employing at least one hydroxyaromatic monocarboxylic acid selected from m- and p-hydroxybenzoic acids in a mole ratio relative to the diacid in the range 1:100 to 1:2.

9. The process of claim 6 wherein said organic acid anhydride is derived from a hydrocarbon organic dicarboxylic acid of 2 to 8 carbon atoms; employing a mole ratio of bisphenol:aromatic diacid of about stoichiometric; and a molar ratio of anhydride:aromatic diacid of about 1:1 to 4:1.

10. The process of claim 9 wherein said acid anhydride is selected from the group consisting of acetic anhydride, propionic anhydride, butyric anhydride, valeric anhydride, caproic anhydride, caprylic anhydride, and mixtures thereof.

11. The process of claim 9 wherein said aromatic dicarboxylic acid is a mixture of isophthalic acid and terephthalic acid.

12. The process of claim 11 wherein said bisphenol is Bisphenol-A, and said acid anhydride is acetic acid.

13. The process of claim 12 employing said isophthalic acid:terephthalic acid in a mole ratio of about 90:10 to 30:70.

14. The process of claim 1 wherein said:
   (a) first temperature is about 120° C. to 160° C., and said pressure is about 0 to 120 psig;
   (c) vacuum condition is about 1 to 30 mm Hg, and said third time interval is about 1 to 1.5 hours; and
   (d) fourth time interval is about 2 to 4 hours.

15. The process of claim 14 wherein said:
   (a) first temperature is about 130° C. to 140° C., said first time interval is about 0.5 to 0.75 hours, and said pressure is about 0 to 120 psig;
   (b) second temperature is about 280° C. to 330° C., and said second time interval is about 1 to 2 hours;
   (c) vacuum condition is about 1 to 5 mm Hg, and said third time interval is about 1 to 1.5 hours; and
   (d) fourth time interval is about 2 to 3 hours.

16. The process of preparation of a polyarylate which comprises heating in a reactor means a reaction admixture comprising at least one bisphenol, at least one aromatic dicarboxylic acid, and at least one organic acid anhydride, in polyarylate forming proportions, wherein said proportions employ a mol ratio of bisphenol:aromatic diacid of about 0.8:1 to 1.2:1, conducting said process in steps comprising the sequence:
   (1) heating said reaction admixture under an inert gas atmosphere over a time interval of about 0.25 to 2 hours up to a moderately elevated first temperature in the range of about 120° to 160° C. under a pressure of about 0 to 120 psig;
   (2) maintaining said first temperature for about 1 to 3 hours;
   (3) elevating the temperature of the reaction admixture to a second temperature in the range of about 280° to 330° C.;
   (4) maintaining said second temperature for about 1 to 4 hours;
   (5) reducing the pressure gradually to a vacuum condition of about 1 to 30 mm Hg during a time interval of about 1 to 1.5 hours, while substantially maintaining said second temperature;
   thereby preparing a prepolymer; and
   (6) heating said prepolymer at substantially said higher second temperature at said vacuum condition for about 2 to 4 hours,
   thereby preparing said polyarylate.

17. The process of claim 16 wherein said inert gas, selected from helium, argon, and neon, passes through said reaction admixture in steps (1) and (2).

18. The process of claim 17 employing in step (1) a pressure > than 0 psig; and in step (3), prior to said elevating, venting said reactor means over about 10 minutes.

* * * * *